United States Patent
Fritz, Sr.

(10) Patent No.: US 6,170,733 B1
(45) Date of Patent: *Jan. 9, 2001

(54) BREAKAWAY MOUNTING DEVICE FOR USE WITH PRINTED CIRCUIT BOARD FLOW SOLDER MACHINES

(75) Inventor: James Arthur Fritz, Sr., Garland, TX (US)

(73) Assignee: Fritz & Hill Corporation, Garland, TX (US)

( * ) Notice: Under 35 U.S.C. 154(b), the term of this patent shall be extended for 0 days.

This patent is subject to a terminal disclaimer.

(21) Appl. No.: 09/370,257

(22) Filed: Aug. 9, 1999

Related U.S. Application Data

(63) Continuation-in-part of application No. 09/031,503, filed on Feb. 26, 1998, now Pat. No. 5,967,398.

(51) Int. Cl.[7] .............................. B23K 37/04; B23Q 1/00; B65G 15/00
(52) U.S. Cl. ...................... 228/49.5; 198/626.6; 198/817; 269/46
(58) Field of Search ........................ 228/49.5; 198/626.6, 198/817, 626.1, 626.5; 269/46

(56) References Cited

U.S. PATENT DOCUMENTS

| 3,179,237 | 4/1965 | Ninneman | 198/165 |
|---|---|---|---|
| 3,286,817 | 11/1966 | Brigham | 198/179 |
| 3,454,142 | 7/1969 | Holstein | 198/162 |
| 3,848,864 | 11/1974 | Dwyer et al. | 269/48 |
| 4,570,785 | 2/1986 | Lewwanski et al. | 198/628 |
| 4,629,063 | 12/1986 | Hodlewsky et al. | 198/853 |
| 4,705,159 | 11/1987 | Feliks et al. | 198/468.8 |
| 4,874,081 | 10/1989 | Kondo | 198/803.9 |
| 5,029,696 | 7/1991 | Van Tilburg | 198/626.1 |

FOREIGN PATENT DOCUMENTS

| 62-275569A | 11/1987 | (JP) | 228/49.5 |
|---|---|---|---|
| 63-256266A | 10/1988 | (JP) | 228/49.5 |

*Primary Examiner*—Patrick Ryan
*Assistant Examiner*—Kiley Stoner
(74) *Attorney, Agent, or Firm*—Locke Liddell & Sapp LLP

(57) ABSTRACT

A mounting device for use with a printed circuit board solder machine having a pair of conveyors, where the printed circuit board is disposed between the conveyors for transport through the solder machine includes a body having a top and bottom portion. The top portion of the body includes structure for connecting the body to one of the pair of conveyors. The body is breakable when a predetermined pressure is exerted on the body to prevent damaged devices from interfering with the operation of the solder machine. Structure is further provided on the body for grasping a printed circuit board.

2 Claims, 2 Drawing Sheets

BREAKAWAY MOUNTING DEVICE FOR USE WITH PRINTED CIRCUIT BOARD FLOW SOLDER MACHINES

RELATED APPLICATION

This application is a continuation-in-part of application Ser. No. 09/031,503, filed Feb. 26, 1998, and entitled "BREAKAWAY MOUNTING DEVICE FOR USE WITH PRINTED CIRCUIT BOARD FLOW SOLDER MACHINES" and now U.S. Pat. No. 5,967,398.

TECHNICAL FIELD OF THE INVENTION

The present invention relates to flow solder machines, and more particularly to a breakaway mounting device for supporting printed circuit boards as they pass through flow solder machines.

BACKGROUND OF THE INVENTION

Flow solder machines include heaters for heating solder to the molten state in a reservoir, pumps for forcing the molten solder to flow over a barrier to produce an artificial "wave", and transporters to transport a preheated circuit board into contact with the solder wave, thereby enabling a thin layer of solder to adhere to the board. The resulting coating of solder provides an electrical path between electrical components mounted on the printed circuit board.

Flow solder machines also include a movable conveyor arranged along each side of the machine to support the ends of the printed circuit board as the printed circuit board moves through the machine. Typically, support for the printed circuit board on a conveyor is provided by a plurality of "fingers" which grip the printed circuit board on each side and carry the printed circuit board through a fluxing station, a pre-heater station and then into contact with the molten solder.

Prior art fingers include metal pieces shaped to contact the edges of the printed circuit board to support the printed circuit board as it moves through the soldering machine. These fingers typically require cleaning and replacement due to damage caused by buildup of solder, solder flux, and dross or sludge. Where cleanup cannot be accomplished, such fingers must be discarded. Additionally, such prior art fingers may bend and distort resulting in damage to various components of the flow solder machine, such as, for example, conveyor rails, conveyors, flux air knifes, finger cleaners, and other fingers, as well as the printed circuit board itself. To repair the damaged fingers, it is necessary to shut down the flow solder machine, wait for a cool down period, remove and clean fingers, replace damaged fingers, and restart the heating cycle of the flow solder machine. This procedure is costly both from lost time and material replacement costs.

A need has thus arisen for a finger for use in supporting a printed circuit board in a flow solder machine that is easily cleanable to remove buildup of solder, solder flux and dross in an efficient maimer. A need has further arisen for a finger that will not damage flow solder machine components and printed circuit boards when stress is applied to the finger.

SUMMARY OF THE INVENTION

In accordance with the present invention, a mounting device for use with a printed circuit board solder machine having a pair of conveyors, where the printed circuit board is disposed between the conveyors for transport through the solder machine is provided. The mounting device includes a body having a top and bottom portion. The top portion of the body includes structure for connecting the body to one of the pair of conveyors. The body is breakable when a predetermined pressure is exerted on the body to prevent damaged devices from interfering with the operation of the solder machine. Structure is further provided on the body for grasping a printed circuit board.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
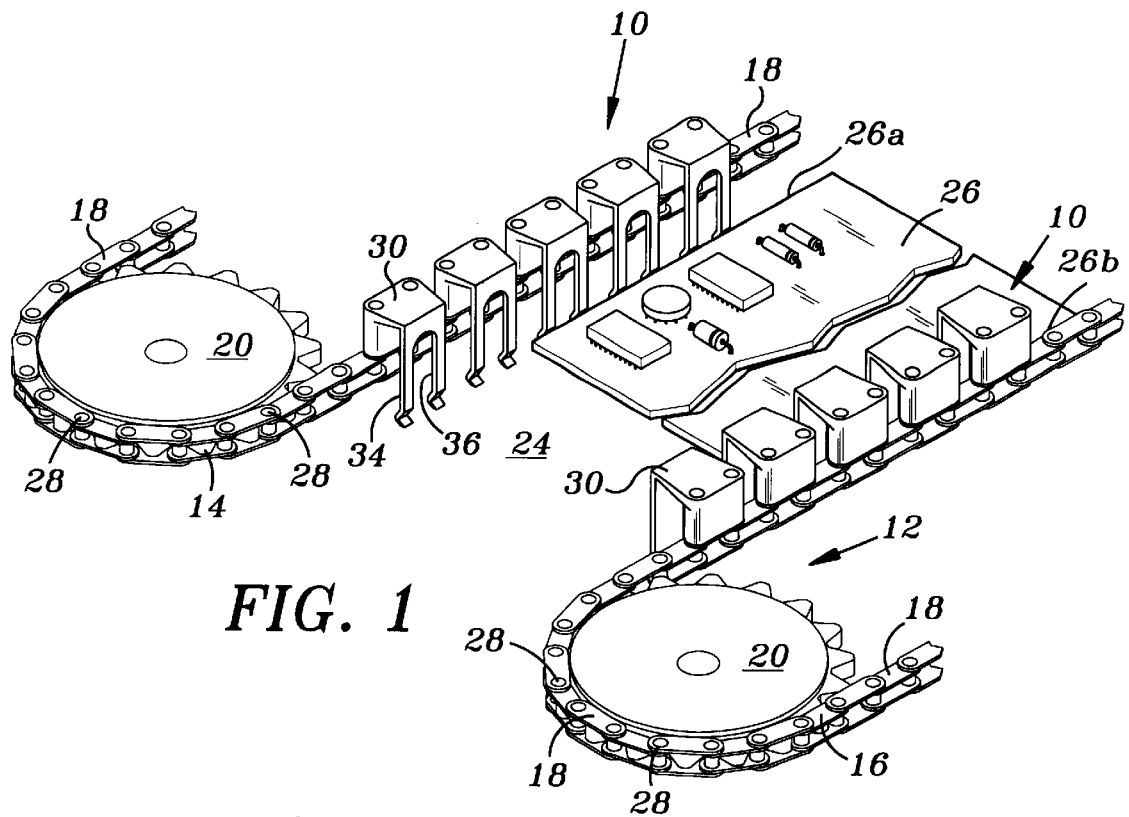
FIG. 1 is a perspective view of a portion of a flow solder machine including a device for mounting printed circuit boards.
Figure 2:
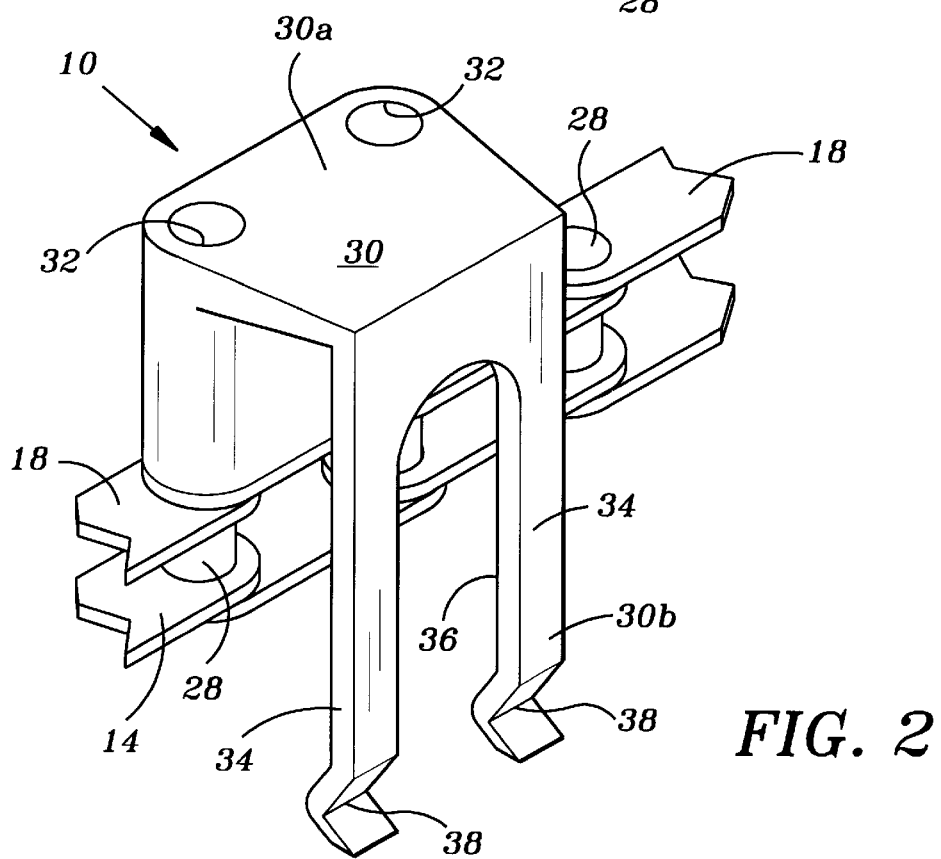
FIG. 2 is an enlarged perspective view of the mounting device and conveyor shown in FIG. 1.

Referring simultaneously to FIGS. 1 and 2, wherein like numerals are utilized for like and corresponding components, a mounting device is illustrated, and is generally identified by the numeral 10. Mounting device 10 is utilized in connection with a flow solder machine, a portion of which is illustrated and is identified by numeral 12. Flow solder machine 12 includes two endless conveyors or chains 14 and 16 in a form of, for example, a link chain having links 18 which are mounted about gear wheels 20.

Wheels 20 are placed such that in an active area 24 is defined where a printed circuit board 26 is disposed. Chains 14 and 16 lie parallel to each other to received printed circuit board 24 for transport through wave solder machine 12. Each link 18 of chains 14 and 16 is interconnected via a hinge pin 28 such that the links 18 extend above the surface of gear wheels 20. Disposed on each link 18 and connected via pins 28, are mounting devices 10. Mounting devices 10 may be disposed in a guide rail (not shown) and serve to grasp and transport printed circuit board 26 through wave solder machine 12.

Referring more specifically to FIG. 2, mounting device 10 includes a body 30 having a top portion 30a and a bottom 30b. Top portion 30a of body 30 includes apertures 32 for receiving pins 28 in order to attach mounting device 10 to links 18 of chains 14 and 16. An important aspect of the present invention is a pair of spaced apart fingers 34 which extend between top portion 30a and bottom portion 30b of body 30. Disposed between fingers 34 is a generally U-shaped slot 36. Disposed near bottom portion 30b of body 30 are V-shaped ends 38 for grasping printed circuit board 26 along edges 26a and 26b.

An important aspect of the present invention is that fingers 34 are breakable when fingers 34 experience a predetermined stress or pressure when moving through flow solder machine 12. In this manner, mounting devices 10 do not interfere with the operation of flow solder machine 12, where instead of bending, fingers 34 merely break away. Body 30 of mounting device 10 may be constructed of a glass filled or liquid crystal polymer, and is formed in a unitary structure. Typical characteristics of the polymer utilized for forming mounting device 10 include a density of 1610 Kg/m$^3$; a tensile strength of 160 Mps, and a melting point of 335° C. The plastics utilized for fabricating the present mounting device 10 allow for minimal solder, solder flux and dross adherence, easy cleanup, and exhibit resiliency to flexibly grasp printed circuit boards as such boards are transported through a flow solder machine.

Figure 3:
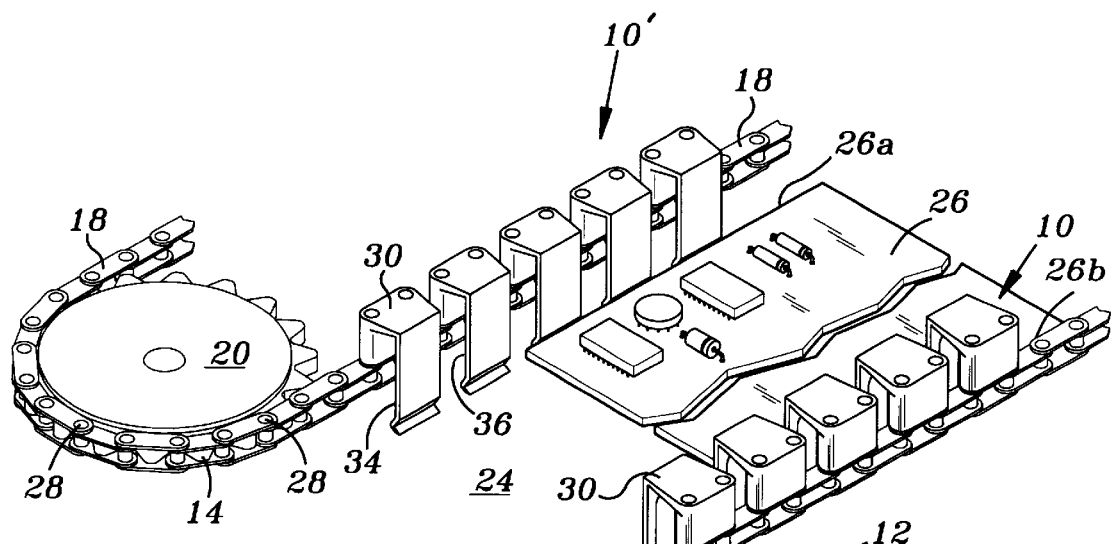
FIG. 3 is a perspective view of a portion of a flow solder machine including the mounting device of the present invention.
Figure 4:
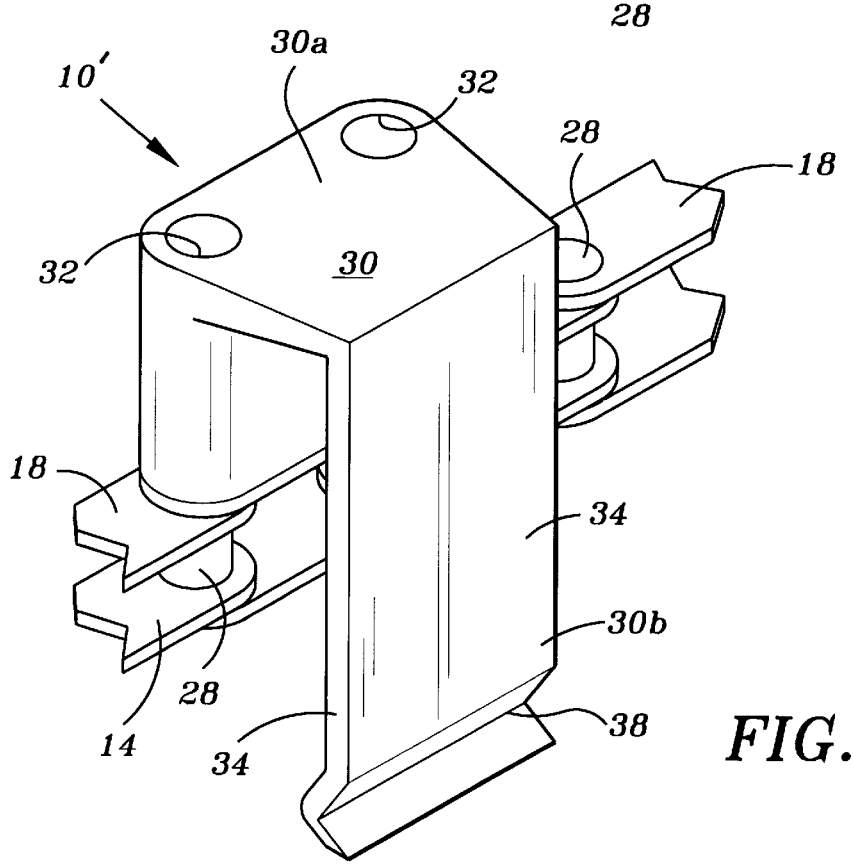
FIG. 4 is an enlarged perspective view of the mounting device and conveyor shown in FIG. 3.

Referring simultaneously to FIGS. 3 and 4, wherein like numerals are utilized for like and corresponding components previously identified with respect to FIGS. 1 and 2, the present mounting device is illustrated, and generally identified by the numeral 10'. Device 10' includes a single finger 34 which extends between top portion 30a and bottom portion 30b of body 30. Finger 34 is breakable when body 30 experiences a predetermined stress or pressure when moving through flow solder machine 12.

It therefore can be seen that the present invention provides for an improved mounting device for a printed circuit board as such boards are transported through a flow solder machine. The present mounting device minimizes damage to the flow solder machine and the printed circuit board, provides for easy cleanup and is economical to use from a time and material standpoint.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A device for use with a printed circuit board soldering machine having a pair of conveyors, where the printed circuit board is disposed between the conveyors for transport by the conveyors through the soldering machine, the device for mounting a printed circuit board to the conveyors comprising:

a body having a top portion and a bottom portion;

said body top portion including means for connecting said body to one of the pair of conveyors;

said body being breakable when a predetermined pressure is exerted on said body to thereby prevent damaged devices from interfering with the operation of the solder machine; and means disposed on said body for grasping a printed circuit board.

2. The device of claim 1 wherein said body includes liquid crystal polymer material.

* * * * *